(12) United States Patent
Eurich (10) Patent No.: US 11,649,907 B2
(45) Date of Patent: May 16, 2023

(54) VALVE, MODULAR SYSTEM FOR MANUFACTURING VALVES, AND METHOD OF MANUFACTURING VALVES

(71) Applicant: Buerkert Werke GmbH & Co. KG, Ingelfingen (DE)

(72) Inventor: Werner Eurich, Ingelfingen (DE)

(73) Assignee: Buerkert Werke GmbH & Co. KG, Ingelfinger (DE)

( * ) Notice: Subject to any disclaimer, the term of this patent is extended or adjusted under 35 U.S.C. 154(b) by 149 days.

(21) Appl. No.: 17/159,837

(22) Filed: Jan. 27, 2021

(65) Prior Publication Data

US 2021/0239234 A1 Aug. 5, 2021

(30) Foreign Application Priority Data

Feb. 3, 2020 (DE) ...................... 10 2020 102 652.8

(51) Int. Cl.
*F16K 31/122* (2006.01)
*F16K 41/00* (2006.01)
(Continued)

(52) U.S. Cl.
CPC ........ *F16K 31/1221* (2013.01); *F16K 15/048* (2013.01); *F16K 31/163* (2013.01); *F16K 41/003* (2013.01)

(58) Field of Classification Search
CPC .. F16K 31/1226; F16K 15/048; F16K 41/003; F16K 31/163; F16K 31/1221
See application file for complete search history.

(56) References Cited

U.S. PATENT DOCUMENTS 3,168,853 A * 2/1965 Prince ..................... F15B 15/24
  92/163
3,485,141 A * 12/1969 Douglas .............. F15B 11/0365
  92/111
(Continued)

FOREIGN PATENT DOCUMENTS

EP 1640649 A1 3/2006
EP 3170769 A1 5/2017

*Primary Examiner* — Daphne M Barry
(74) *Attorney, Agent, or Firm* — McNees Wallace & Nurick llc (57) ABSTRACT

In a valve (10) having a pneumatic or hydraulic drive unit (20), the drive unit (20) includes a cylinder (22), a piston (24), a spindle unit (26) mounted for axial movement in the cylinder (22), and a housing cover (28), the piston (24) dividing the interior of the cylinder (22) into a cover-side space (42) and a valve seat-side space (40), and a duct (66) within the spindle unit (26) leading to the valve seat-side space (40). Formed in the housing cover (28) are a fluid intake (44) and a fluid exit (46) as well as a pressure fluid duct (48) in fluid communication with the fluid intake (44) and an outlet duct (50) in fluid communication with the fluid exit (46). The pressure fluid duct (48) branches into two partial ducts (54, 56), a first partial duct (54) extending through the spindle unit (26) into the valve seat-side space (40) and opening out there, and a second partial duct (56) opening out into the cover-side space (42), and a closure body (68) being provided which seals either the first partial duct (54) or the second partial duct (56) in a fluid-tight manner. Furthermore, a modular system (70) and a method for manufacturing valves (10) are indicated.

17 Claims, 7 Drawing Sheets

(51) Int. Cl.
*F16K 15/04* (2006.01)
*F16K 31/163* (2006.01)

(56) References Cited

U.S. PATENT DOCUMENTS

| | | | | |
|---|---|---|---|---|
| 3,921,660 | A * | 11/1975 | Kowalski | F16K 11/02 |
| | | | | 137/236.1 |
| 5,186,095 | A * | 2/1993 | Todd | F15B 15/204 |
| | | | | 91/518 |
| 6,244,563 | B1 * | 6/2001 | Ejiri | F16K 31/1225 |
| | | | | 92/151 |
| 6,783,107 | B2 * | 8/2004 | Chatufale | F15B 1/24 |
| | | | | 251/63.5 |
| 10,865,889 | B2 * | 12/2020 | Itoh | F15B 13/0405 |
| 2003/0037544 | A1 * | 2/2003 | Armstrong | E21B 33/0355 |
| | | | | 60/413 |
| 2003/0201015 | A1 * | 10/2003 | Fukano | F16K 7/14 |
| | | | | 137/556 |
| 2004/0195533 | A1 * | 10/2004 | Mall | F16K 7/126 |
| | | | | 251/63.5 |
| 2007/0290154 | A1 * | 12/2007 | Aoyama | F16K 31/1226 |
| | | | | 251/63 |
| 2016/0123491 | A1 * | 5/2016 | Chiba | F16K 31/1221 |
| | | | | 156/345.24 |
| 2017/0292626 | A1 * | 10/2017 | Zhang | F16J 15/3452 |

* cited by examiner

VALVE, MODULAR SYSTEM FOR MANUFACTURING VALVES, AND METHOD OF MANUFACTURING VALVES

The invention relates to a valve having a pneumatic or hydraulic drive unit, a modular system for manufacturing valves, and a method of manufacturing valves.

Pneumatic valves and hydraulic valves are known in a large number of different variants. Depending on customer requirements, the valves are constructed as NC valves or as NO valves. The respective drive units of NC valves and of NO valves are configured differently, so that usually only a small number of identical parts can be used in the production of NC valves and NO valves. This leads to a large variety of components, which has a negative effect on production costs and stock-keeping costs.

It is therefore an object of the invention to allow NC valves and NO valves to be produced particularly cost-effectively.

This object is achieved in accordance with the invention by a valve having a pneumatic or hydraulic drive unit, which includes a cylinder, a piston, a spindle unit mounted for axial movement in the cylinder, and a housing cover. The piston divides the interior of the cylinder into a cover-side space and a valve seat-side space, with a duct within the spindle unit leading to the valve seat-side space. Formed in the housing cover are a fluid intake and a fluid exit as well as a pressure fluid duct in fluid communication with the fluid intake and an outlet duct in fluid communication with the fluid exit. The pressure fluid duct branches into two partial ducts, a first partial duct extending through the spindle unit into the valve seat-side space and opening out there, and a second partial duct opening out into the cover-side space, with a closure body being provided which seals either the first partial duct or the second partial duct in a fluid-tight manner.

The valve according to the invention has the advantage that it can be operated both as an NO valve and as an NC valve. NO stands for "normally open" and denotes a normally open valve, whereas NC stands for "normally closed" and denotes a normally closed valve. In this context, "normal" refers to a non-energized state or a state in which the valve is not acted upon by a fluid under pressure.

The options of operating the valve as an NO valve or as an NC valve are given as a result of the pressure fluid duct branching and extending both to the valve seat-side space and to the cover-side space. A defined closure of one partial duct of the pressure fluid duct by the closure body allows to define whether the valve seat-side space or the cover-side space is supplied with a pressure fluid when the valve is operated. Depending on which partial duct the closure body closes, the piston will be raised (NC valve) or lowered (NO valve) when pressure fluid is supplied.

The valve according to the invention thus offers a high degree of variability.

A valve seat-side space refers to the space arranged closest to a valve seat of the valve. Similarly, the cover-side space is arranged closest to the housing cover of the valve and is more particularly delimited, at least in sections, by the housing cover. As seen in a side view of the valve, the cover-side space is arranged in particular above the valve seat-side space.

The closure body is a separate part that is inserted into the respective partial duct. The closure body remains fixed in position and immovable within the respective partial duct to seal it permanently.

According to one embodiment, the outlet duct also branches into two partial ducts, with a first partial duct extending through the spindle unit and into the valve seat-side space and opening out there, and a second partial duct opening out into the cover-side space. Here, preferably a further closure body is provided which seals either the first or the second partial duct of the outlet duct in a fluid-tight manner, more specifically such that only one of the pressure fluid duct and the outlet duct is in fluid communication with the cover-side space and the other of the pressure fluid duct and the outlet duct is in fluid communication with the valve seat-side space. For example, the first closure body seals the first partial duct of the pressure fluid duct when the further closure body seals the second partial duct of the outlet duct, and vice versa. As a result, an appropriate arrangement of the closure bodies allows to define which duct is in fluid communication with the valve seat-side space and which duct is in fluid communication with the cover-side space. In particular, the closure bodies are arranged such that each of the valve seat-side space and the cover-side space is in fluid communication with only one of the outlet duct and the pressure fluid duct. This ensures that the valve can be operated properly. The term "one of the . . . " means that one of the alternatives from the aforementioned group of ducts can be selected.

According to one embodiment, one duct section each of the pressure fluid duct and/or of the outlet duct extends within the housing cover, and the pressure fluid duct and the outlet duct have a common duct outside the housing cover. In this way, the valve can have a particularly compact design. When the valve is in operation, however, the common duct serves either only as the pressure fluid duct or only as the outlet duct. This is achieved by the appropriate arrangement of the closure bodies.

In particular, the common duct of the pressure fluid duct and the outlet duct is that duct which, starting from the housing cover, extends through the spindle unit to the valve seat-side space.

Inside the housing cover, the pressure fluid duct and the outlet duct are preferably formed separately from one another. This simplifies the fluidic separation of the pressure fluid duct and the outlet duct.

For example, the at least one closure body is a ball, in particular a metal ball. This makes the closure body particularly suitable for a permanent, reliable sealing of the pressure fluid duct or the outlet duct. The ball shape is particularly well adapted to the generally round cross-section of the ducts.

Preferably, the at least one closure body is pressed into the respective partial duct. In other words, the closure body is non-positively fixed in the respective partial duct. This also contributes to a reliable sealing of the pressure fluid duct or of the outlet duct. Furthermore, no additional fastening means are required for fastening the closure body, which in turn has an advantageous effect on the compact construction of the valve.

To ensure a particularly tight fit of the closure body, the partial ducts may be tapered.

For example, the duct sections of the pressure fluid duct and/or of the outlet duct formed in the housing cover each have an axially extending duct section, and the two partial ducts branch off radially from the axially extending duct section, in particular in opposite directions. The axially extending duct sections make the pressure fluid duct and the outlet duct accessible from an outside of the valve, in particular from an outside of the housing cover. This allows fluid to be supplied to, and discharged from, the pressure fluid duct and the outlet duct, respectively. Since the two partial ducts branch off radially from the axially extending duct section, in particular in opposite directions, it is possible to fluidically connect the pressure fluid duct and/or the outlet duct in a simple manner both to the valve seat-side space and to the cover-side space.

According to one embodiment, the cover-side space has an elastic element arranged therein which urges the piston to a closing position. This contributes to a configuration of the valve as an NC valve. Alternatively, the valve seat-side space has an elastic element arranged therein which urges the piston to an opening position. This contributes to the configuration of the valve as an NO valve.

According to one embodiment, the spindle unit is connected to a closure part which is configured to close a valve seat in a closing position of the spindle unit. In this way, the valve can be opened or closed by an axial movement of the spindle unit.

In particular, the spindle unit comprises a hollow spindle. This allows at least part of the pressure fluid duct and/or the outlet duct to be formed inside the spindle unit.

According to one embodiment, the piston is firmly fixed to the spindle unit. By conducting a fluid under pressure into the valve seat-side space or the cover-side space and lifting or lowering the piston, the spindle unit can thus be moved axially to open or close the valve.

The piston may be of a plate-shaped or wave-shaped configuration. The shape of the piston can be used to define a size of the valve seat-side space and the cover-side space.

The object is further achieved in accordance with the invention by a modular system for manufacturing valves which are constructed like the valve described above, including a pneumatic or hydraulic drive unit which comprises a cylinder, a spindle unit mounted for axial movement in the cylinder, and a housing cover, and at least two pistons of different shape which are adapted to be selectively inserted into the interior of the cylinder in order to divide the interior of the cylinder into a cover-side space and a valve seat-side space and to functionally complete the drive unit selectively with one of the pistons.

Depending on the piston selected, the valve is operable as an NO valve or as an NC valve.

The modular system according to the invention thus allows NO valves and NC valves to be manufactured which have a particularly high number of identical components. In particular, in an NO valve and an NC valve manufactured by means of the modular system according to the invention, only the pistons differ from each other. The other components are identical. This has an advantageous effect on production costs and stock-keeping costs. In particular, the possibility of using the housing cover, usually fabricated as a cast part, in both variants permits high cost savings, since the fabrication of cast parts requires tool molds that involve relatively high investment costs.

Using the modular system, the decision as to whether the valve is to be constructed as an NO valve or as an NC valve can still be made while the valve is being assembled.

The cylinder, the spindle unit and the housing cover of the drive unit of the modular system are configured as described in connection with the valve according to the invention.

The object is further achieved in accordance with the invention by a method of manufacturing valves that are configured in the same way as the valve described above, by means of a modular system as described above. The method includes the steps of:

providing a modular system;
selecting a piston from the modular system; and
inserting the piston into the drive unit such that the piston divides the interior of the cylinder into a cover-side space and a valve seat-side space.

The method according to the invention allows a valve as described above to be manufactured particularly simply and cost-effectively.

In a further method step, preferably at least one closure body is inserted into the housing cover, in particular before or after inserting the piston into the interior of the cylinder. In this way, the cover-side space and the valve seat-side space are assigned to the respective ducts.

According to one embodiment, the at least one closure body is inserted into the housing cover before the housing cover is mounted to the drive unit. Before mounting the housing cover, the partial ducts are particularly easily accessible. However, insertion may also be effected afterwards.

Further advantages and features of the invention will be apparent from the description below and from the accompanying drawings, to which reference is made and in which.

Figure 1:
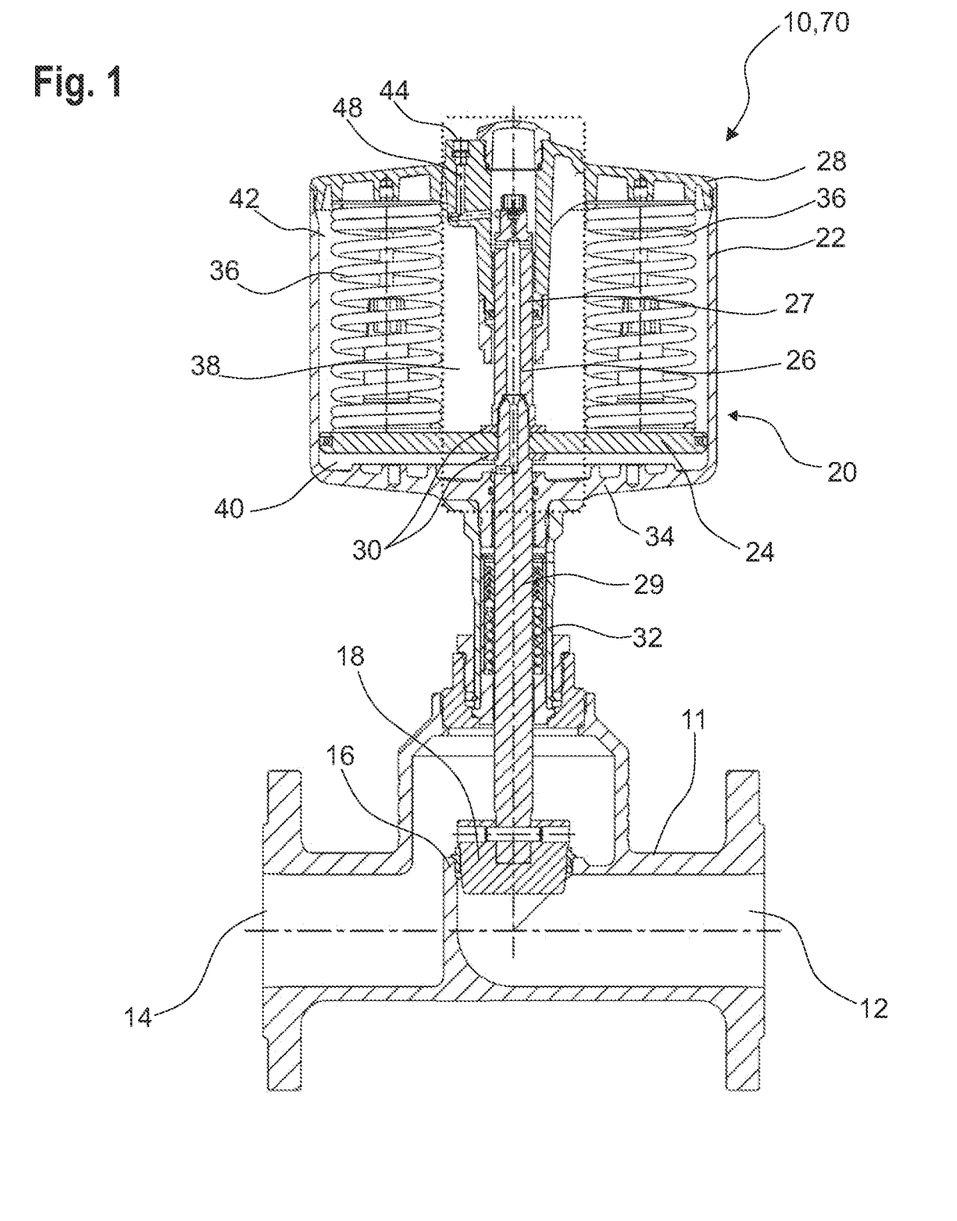
FIG. 1 shows a sectional illustration of a valve according to the invention.

FIG. 1 shows a sectional representation of a valve 10, more precisely an NC valve, i.e. a normally closed valve 10 or valve 10 that is closed when pressureless.

The valve 10 has a fluid housing 11 having a fluid inlet 12 and a fluid outlet 14 and a valve seat 16 located between the fluid inlet 12 and the fluid outlet 14.

FIG. 1 shows the valve 10 in a closed state, in which a closure part 18 rests against a valve seat 16, thereby closing the valve 10, that is, blocking a fluid flow from the fluid inlet 12 to the fluid outlet 14.

To lift the closure part 18 and open the valve 10, the valve 10 comprises a pneumatic or hydraulic drive unit 20. The drive unit 20 has a cylinder 22, a piston 24 arranged in the cylinder 22, a spindle unit 26 mounted for axial movement in the cylinder 22, and a housing cover 28 that closes the cylinder 22 on the face side.

The spindle unit 26 is constructed in several parts and comprises a hollow spindle 27 and a spindle extension 29 attached to the hollow spindle 27 on the face side. For example, the hollow spindle 27 and the spindle extension are bolted together.

The spindle unit 26 is firmly connected to the closure part 18, thus forming a connection between the drive unit 20 and the closure part 18.

The piston 24 is likewise firmly connected to the spindle unit 26, in particular by means of two bearing rings 30 that rest against opposite sides of the piston 24.

Here, the piston 24 is mounted in the cylinder 22 so as to be displaceable in the longitudinal direction, in particular in the longitudinal direction of the spindle unit 26.

In the embodiment illustrated in FIG. 1, the piston 24 is formed to have a plate shape.

In order to connect the drive unit 20 to the fluid housing 11, a tube 32 is provided which is fastened to a bottom 34 of the cylinder 22 and to the fluid housing 11.

The spindle unit 26 extends from the cylinder 22 through the tube 32 and into the fluid housing 11.

To hold the closure part 18 in its closing position and to prevent unintentional opening of the valve 10, for example, two or more elastic elements 36 are provided, which urge the piston 24 to a closing position. In the illustrated exemplary embodiment, the elastic elements 36 are helical springs. Optionally, up to six spring assemblies each having up to three individual springs can be installed.

The cylinder 22 and the housing cover 28 jointly define a cylinder space 38. The piston 24 divides this cylinder space 38, in particular the interior of the cylinder 22, into a valve seat-side space 40 and a cover-side space 42.

Figure 2:
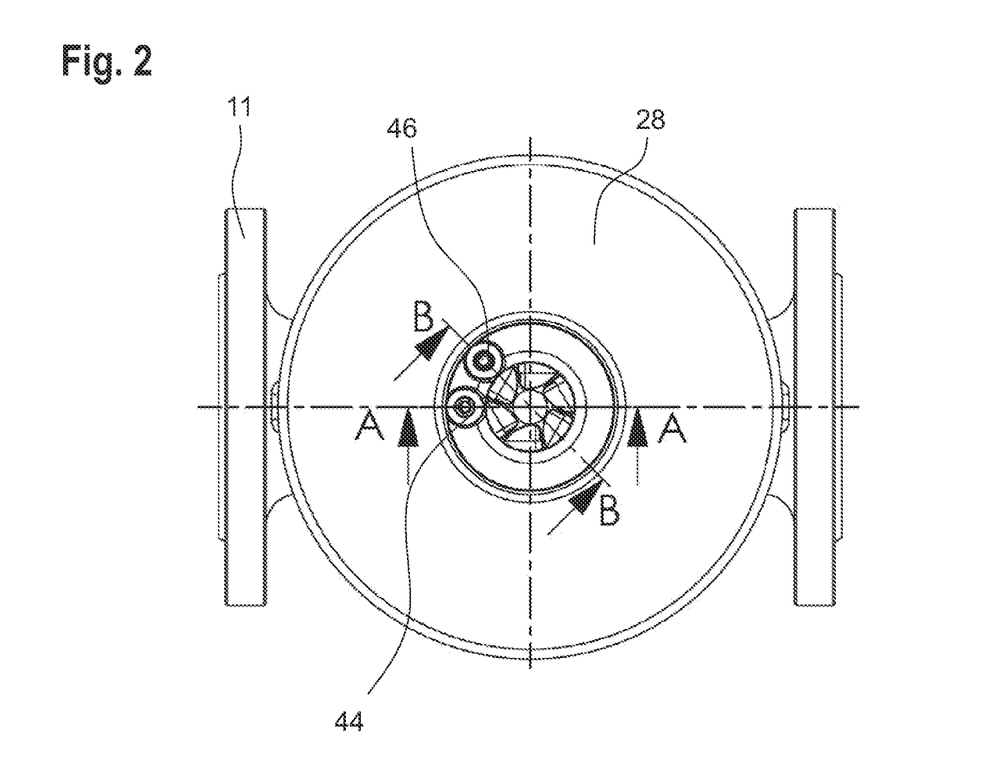
FIG. 2 shows a top view of the valve from FIG. 1.

A fluid intake 44 and a fluid exit 46 are formed in the housing cover 28, as can be seen in FIG. 2, which shows a top view of the valve 10.

Figure 3:
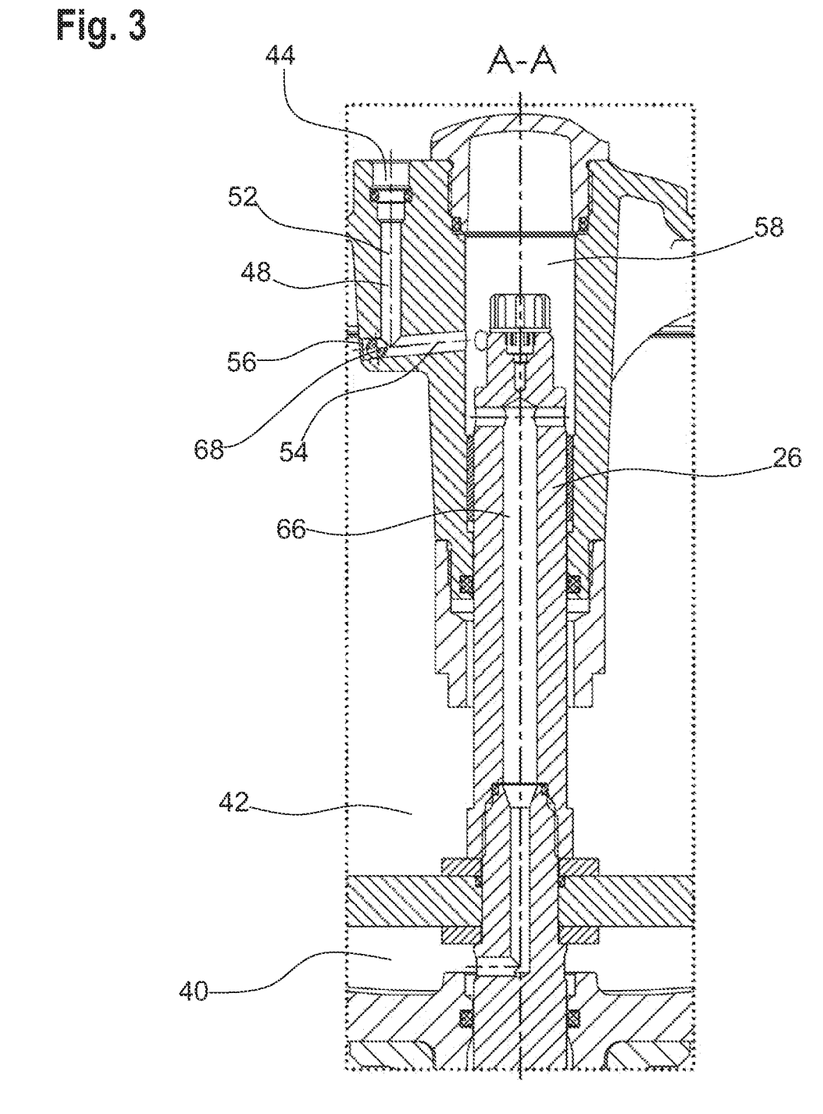
FIG. 3 shows a sectional illustration through part of the valve along the line A-A in FIG. 2.
Figure 4:
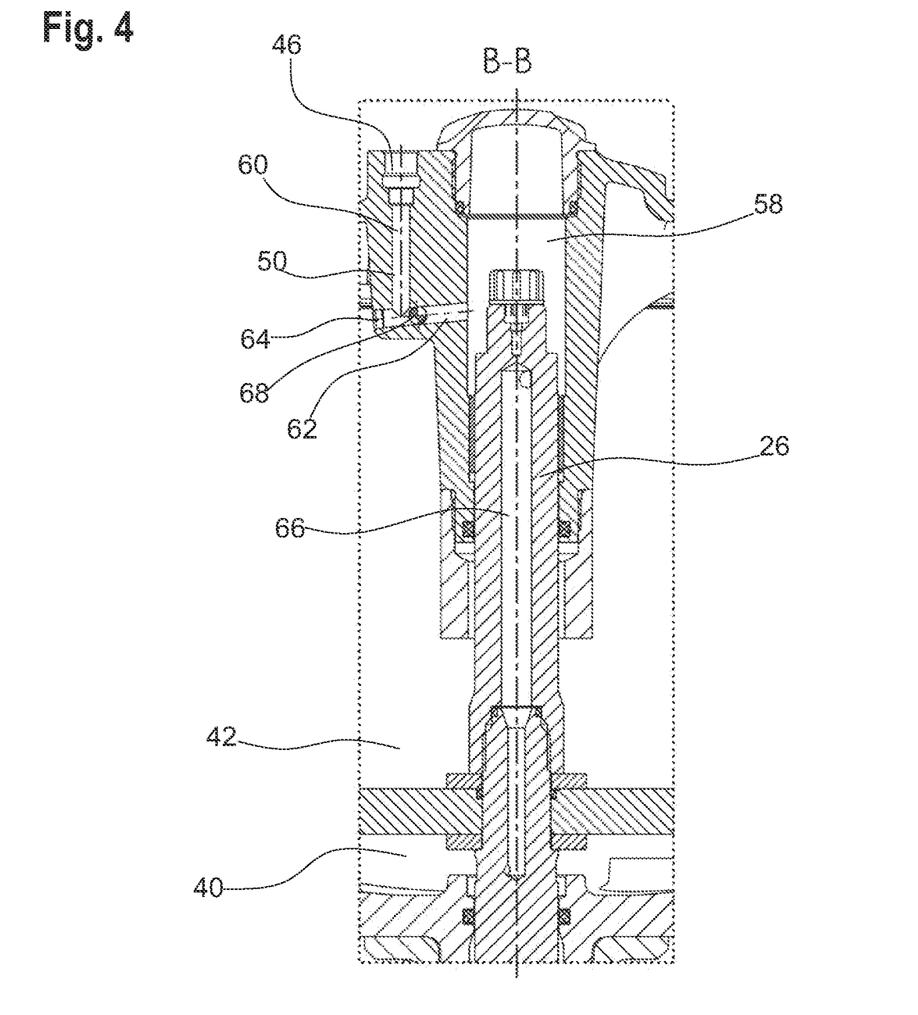
FIG. 4 shows a sectional illustration through part of the valve along the line B-B in FIG. 2.

A pressure fluid duct 48 is in fluid communication with the fluid intake 44, and an outlet duct 50 is in fluid communication with the fluid exit 46. The pressure fluid duct 48 is shown in FIG. 3 and the outlet duct is shown in FIG. 4. FIGS. 3 and 4 each show a partial section taken through the valve 10.

As can be seen in FIG. 3, the pressure fluid duct 48 has a duct section 52 extending axially in the housing cover 28. Starting from the axial duct section 52, the pressure fluid duct 48 branches into two partial ducts 54, 56, which branch off radially from the axially extending duct section 52, more specifically in opposite directions. In other words, the pressure fluid duct 48 has three duct sections 52, 54, 56, which converge at a point of intersection and which are produced by two drilled holes, one extending parallel to the central axis of the spindle 26 and one extending transversely thereto.

The axial duct section 52 need not necessarily extend parallel to a longitudinal axis of the valve 10, as shown in the Figures, but may also extend at an inclination to the longitudinal axis of the valve 10, for example at an angle of up to 20 degrees.

The partial ducts 54, 56 may also extend at right angles to the longitudinal axis of the valve 10.

The first partial duct 54 extends starting from the fluid intake 44 through the housing cover 28 into an intermediate space 58 above the spindle unit 26 and extends from there through the spindle unit 26, more precisely the hollow spindle 27, as far as to the valve seat-side space 40, and opens out there.

The second partial duct 56 extends to the cover-side space 42 and opens out there.

As a result, the pressure fluid duct 48 is connected to both the valve seat-side space 40 and the cover-side space 42.

The same applies to the outlet duct 50. As can be seen in FIG. 4, starting from the fluid exit 46, the outlet duct 50 also has an axially extending duct section 60, starting from which the outlet duct 50 branches into two partial ducts 62, 64, which branch off from the axial duct section 60 in opposite directions.

The first partial duct 62 of the outlet duct 50 extends starting from the fluid exit 46 through the housing cover 28 and also into the intermediate space 58 and from there through the spindle unit 26 as far as to the valve seat-side space 40, and opens out there.

The second partial duct 64 extends to the cover-side space 42 and opens out there. The outlet duct 50 is manufactured, for example, in the same way as the inlet duct 48.

As a result, the outlet duct 50 is also connected to the valve seat-side space 40 and the cover-side space 42.

The ducts 52, 54, 56 of the pressure fluid duct 48 and the ducts 60, 62, 64 of the outlet duct 50 are in the form of drilled holes in the housing cover 28. The partial ducts 54, 56 of the pressure fluid duct 48 continue into each other in alignment. The same applies to the partial ducts 62, 64 of the outlet duct 50.

The pressure fluid duct 48 and the outlet duct 50 have a duct 66 in common, which extends through the spindle unit 26 to the valve seat-side space 40. The duct 66 extends within the spindle unit 26 in an L-shape. The intermediate space 58 is also associated with the pressure fluid duct 48 and the outlet duct 50.

In the housing cover 28, the ducts 48, 50 extend separately from each other.

The valve 10 further comprises two closure bodies 68 configured as individual parts. The closure bodies 68 are balls, in particular metal balls.

As can be seen in FIG. 3, a closure body 68 is pressed into the second partial duct 56 of the pressure fluid duct 48 and thus closes the flow path of the pressure fluid duct 48 to the cover-side space 42.

Another closure body 68 is pressed into the first partial duct 62 of the outlet duct 50, as can be seen in FIG. 4. In this way, the flow path of the outlet duct 50 to the valve seat-side space 40 is closed.

In particular, the closure bodies 68 are arranged outside the axial duct sections 52, 60.

During operation of the valve 10, the valve seat-side space 40 can therefore be supplied with a pressure fluid via the fluid intake 44. The pressure fluid pushes the piston 24 upwards against the force of the elastic element 36. This lifts the closure part 18 off the valve seat 16, allowing a fluid to flow from the fluid inlet 12 to the fluid outlet 14.

While the piston 24 is lifted, fluid is discharged at the same time from the cover-side space 42 via the outlet duct 50 and out of the valve 10.

Figure 5:
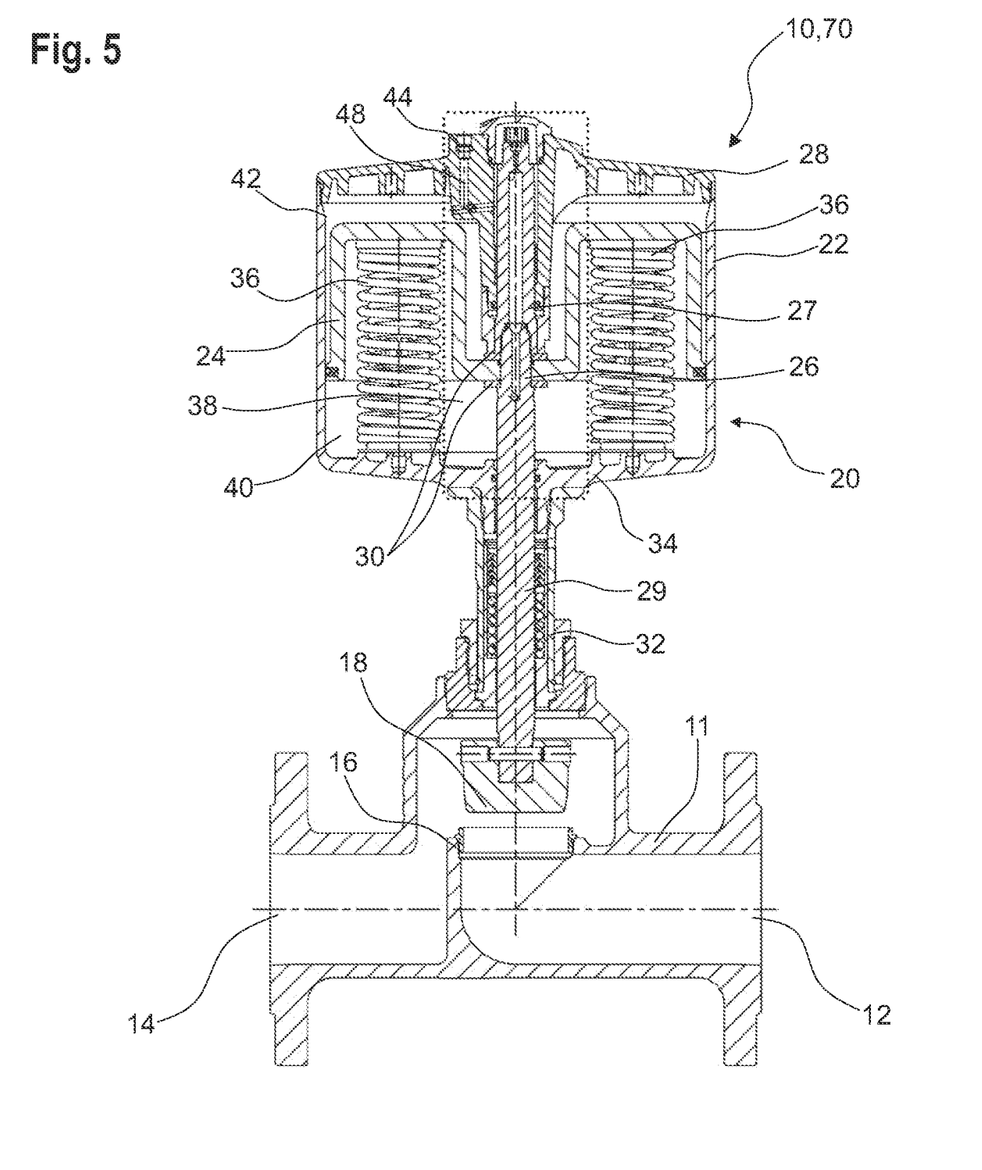
FIG. 5 shows a sectional illustration of a further valve according to the invention.
Figure 6:
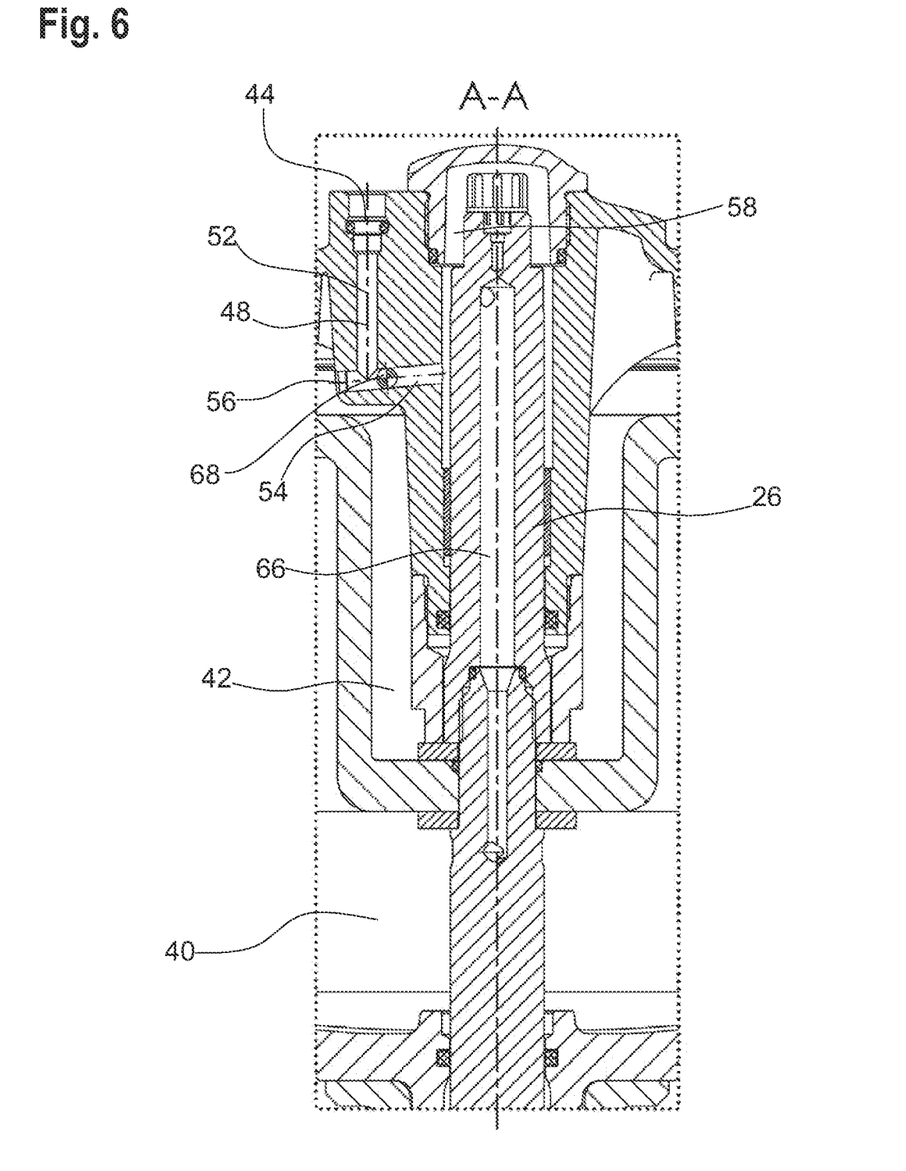
FIG. 6 shows a sectional illustration through part of the valve from FIG. 5.
Figure 7:
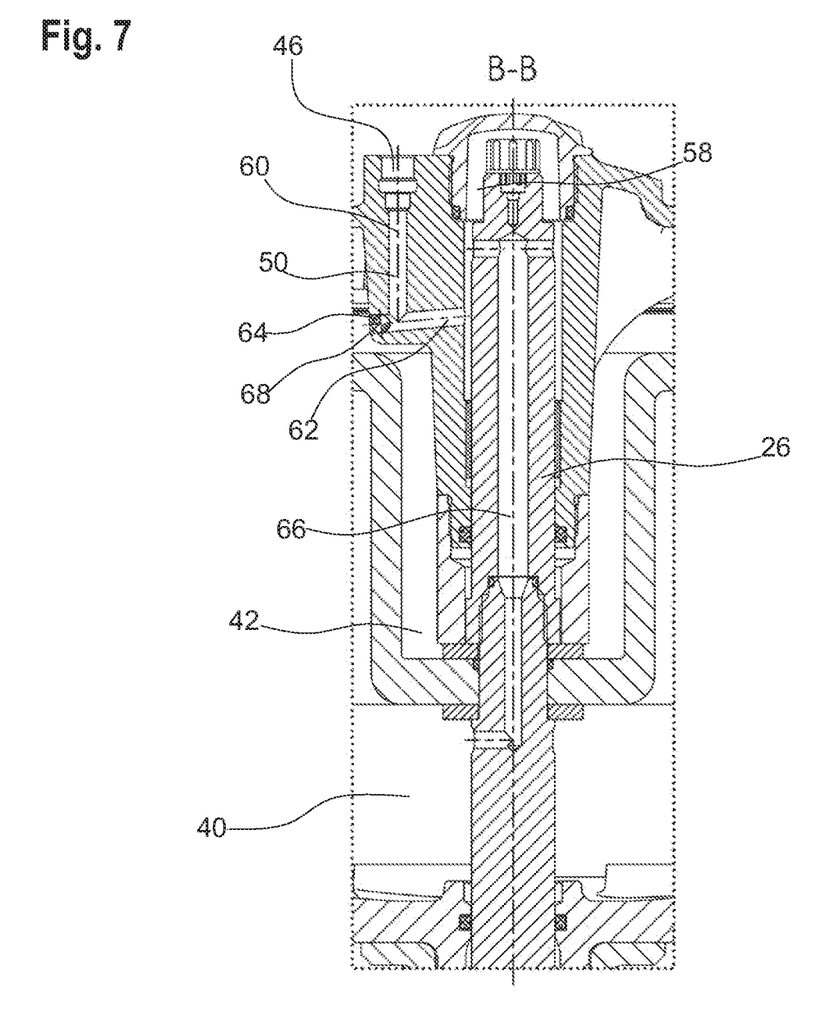
FIG. 7 shows a further sectional illustration through part of the valve from FIG. 5.

FIGS. 5 to 7 illustrate a further embodiment of a valve 10. The valve 10 illustrated in FIGS. 5 to 7 is operable as an NO valve, i.e. as a valve 10 that is normally open or open when not under pressure.

FIG. 5 shows the valve 10 in an open state, in which the closure part 18 is lifted off the valve seat 16 and a fluid flow from the fluid inlet 12 to the fluid outlet 14 is unblocked.

To allow the valve 10 to be operated as an NO valve, the arrangement of the closure bodies 68 differs from the embodiment shown in FIGS. 1 to 4.

In particular, a closure body 68 is pressed into the first partial duct 54 of the pressure fluid duct 48 and thus closes the flow path of the pressure fluid duct 48 to the valve seat-side space 40.

Likewise, a closure body 68 is pressed into the second partial duct 64 of the outlet duct 50, as can be seen in FIG. 7. In this way, the flow path of the outlet duct 50 to the cover-side space 42 is closed.

The elastic elements 36 are not arranged above the piston 24 as in the NC valve, but below the piston 24 in the valve seat-side space 40 and urge the piston 24 to an opening position.

Furthermore, the valve 10 according to FIGS. 5 to 7 differs from the embodiment illustrated in FIGS. 1 to 4 in the shape of the piston 24. In particular, the piston 24 illustrated in FIG. 5 is wave-shaped.

During operation of the NO valve, the cover-side space 42 is supplied with a pressure fluid via the fluid intake 44, the fluid pushing the piston 24 downward against the force of the elastic element 36. This presses the closure part 18 onto the valve seat 16, so that fluid flow from the fluid inlet 12 to the fluid outlet 14 is blocked.

Except for the differently shaped pistons 24, all of the components of the NO valve shown in FIGS. 5 to 7 are identical to the components of the NC valve shown in FIGS. 1 to 4. It is, however, conceivable that in the NC valve, elastic elements 36 having a higher total force than in the NO valve are used to permit a higher switchable medium pressure.

Owing to the large number of identical components, a modular system 70 is suitable for manufacturing the valves 10 described above.

The extent of the modular system 70 becomes apparent from FIGS. 1 and 5. In particular, FIGS. 1 and 5 each show a portion of the modular system 70 after a piston 24 has been selected.

In particular, the modular system 70 comprises a pneumatic or hydraulic drive unit having the cylinder 22, the spindle unit 26 mounted for axial movement in the cylinder 22, and the housing cover 28.

The drive unit is thus universally suitable both for manufacturing an NC valve as illustrated in FIG. 1 and for manufacturing an NO valve as illustrated in FIG. 5.

The modular system 70 further comprises at least two differently shaped pistons 24, for example a plate-shaped piston 24 as shown in FIG. 1 and a wave-shaped piston 24 as shown in FIG. 5.

In addition, the modular system 70 comprises at least two closure bodies 68.

The different pistons 24 can be selectively inserted into the universal drive unit, more specifically into the interior of the cylinder 22, to divide the interior of the cylinder 22 into the cover-side space 40 and the valve seat-side space 42 and to functionally complete the drive unit with the selected piston.

Depending on the piston 24 selected, the valve 10 is operable as an NO valve or as an NC valve.

In addition to the selection of the piston 24, an appropriate arrangement of the closure bodies 68 is also essential for distinguishing whether the valve 10 is operable as an NO valve or as an NC valve.

In the following, a method of manufacturing valves 10 by means of a modular system 70 will be described.

First, a modular system 70 is provided, and it is determined whether the valve 10 to be manufactured is to be an NO valve or an NC valve. An appropriate piston 24 is then selected from the modular system 70.

The piston 24 is inserted into the drive unit such that the piston 24 divides the interior of the cylinder 22 into a cover-side space 42 and a valve seat-side space 40.

Before or after the piston 24 is inserted into the drive unit, two closure bodies 68 are inserted into the housing cover 28, in particular pressed in, to establish a fluid communication, matching the valve type, of the fluid intake 44 and the fluid exit 46 with the valve seat-side space 40 and the cover-side space 42.

Then the housing cover 28 is mounted to the drive unit.

If it is intended to operate the valve 10 as an NC valve, a closure body 68 is pressed into the second partial duct 56 of the pressure fluid duct 48, and a further closure body 68 is pressed into the first partial duct 62 of the outlet duct 50 (see FIGS. 3 and 4).

If it is intended to operate the valve 10 as an NO valve, a closure body 68 is pressed into the first partial duct 54 of the pressure fluid duct 48, and a further closure body 68 is pressed into the second partial duct 64 of the outlet duct 50.

The invention claimed is:

1. A valve comprising:
a pneumatic or hydraulic drive unit, which includes a cylinder, a piston, a spindle unit mounted for axial movement in the cylinder, and a housing cover,
wherein the piston divides an interior of the cylinder into a cover-side space and a valve seat-side space, and a duct in the spindle unit leads to the valve seat-side space,
wherein a fluid intake and a fluid exit as well as a pressure fluid duct in fluid communication with the fluid intake and an outlet duct in fluid communication with the fluid exit are formed in the housing cover, and
wherein the pressure fluid duct in the housing cover branches into two partial ducts, wherein a first partial duct extends through the spindle unit into the valve seat-side space and opens out thereof, and a second partial duct opens out into the cover-side space, and
wherein a first closure body is provided which seals either the first partial duct or the second partial duct in a fluid-tight manner.

2. The valve according to claim 1, wherein the outlet duct branches into two partial ducts, a first partial duct extending through the spindle unit into the valve seat-side space and opening out thereof, and a second partial duct opening out into the cover-side space, and a second closure body being provided which seals either the first partial duct or the second partial duct of the outlet duct in a fluid-tight manner, wherein the first closure body seals the first partial duct of the pressure fluid duct when the second closure body seals the second partial duct of the outlet duct, and vice versa.

3. The valve according to claim 2, wherein only one of the pressure fluid duct and the outlet duct is in fluid communication with the cover-side space and the other of the pressure fluid duct and the outlet duct is in fluid communication with the valve seat-side space.

4. The valve according to claim 1, wherein one duct section of each of the pressure fluid duct and/or of the outlet duct extends within the housing cover, and the pressure fluid duct and the outlet duct have a common duct outside the housing cover.

5. The valve according to claim 4, wherein the common duct is the duct in the spindle unit.

6. The valve according to claim 1, wherein the at least one closure body is a ball.

7. The valve according to claim 6, wherein the at least one closure body is a metal ball.

8. The valve according to claim 1, wherein the at least one closure body is pressed into the respective partial duct.

9. The valve according to claim 1, wherein the duct sections of the pressure fluid duct and/or of the outlet duct formed in the housing cover each have an axially extending duct section, and the two partial ducts branch off radially from the axially extending duct section.

10. The valve according to claim 9, wherein the two partial ducts branch off radially from the axially extending duct section in opposite directions.

11. The valve according to claim 1, wherein the cover-side space has at least one elastic element arranged therein which urges the piston to a closing position.

12. The valve according to claim 1, wherein the valve seat-side space has an elastic element arranged therein which urges the piston to an opening position.

13. The valve according to claim 1, wherein the spindle unit is connected to a closure part which is configured to close a valve seat in a closing position of the spindle unit.

14. The valve according to claim 1, wherein the piston is firmly fixed to the spindle unit.

15. The valve according to claim 1, wherein the piston is of a plate-shaped or wave-shaped configuration.

16. A valve comprising:

a pneumatic or hydraulic drive unit, which includes a cylinder, a piston, a spindle unit mounted for axial movement in the cylinder, and a housing cover, wherein the piston divides the interior of the cylinder into a cover-side space and a valve seat-side space, and a duct in the spindle unit leads to the valve seat-side space, wherein a fluid intake and a fluid exit as well as a pressure fluid duct in fluid communication with the fluid intake and an outlet duct in fluid communication with the fluid exit are formed in the housing cover, wherein the pressure fluid duct branches in the housing cover into two partial ducts, wherein a first partial duct extends through the spindle unit into the valve seat-side space and opens out there, and a second partial duct opens out into the cover-side space, wherein a closure body is provided which seals either the first partial duct or the second partial duct in a fluid-tight manner, and wherein one duct section of each of the pressure fluid duct and/or of the outlet duct extends within the housing cover, and the pressure fluid duct and the outlet duct have a common duct outside the housing cover and wherein in the housing cover, wherein the partial fluid ducts extend separately from each other.

17. A valve comprising:

a pneumatic or hydraulic drive unit, which includes a cylinder, a piston, a spindle unit mounted for axial movement in the cylinder, and a housing cover, wherein the piston divides the interior of the cylinder into a cover-side space and a valve seat-side space, and a duct in the spindle unit leads to the valve seat-side space, wherein a fluid intake and a fluid exit as well as a pressure fluid duct in fluid communication with the fluid intake and an outlet duct in fluid communication with the fluid exit are formed in the housing cover, wherein the pressure fluid duct in the housing cover branches into two partial ducts, wherein a first partial duct extends through the spindle unit into the valve seat-side space and opens out there, and a second partial duct opens out into the cover-side space, wherein a first closure body is provided which seals either the first partial duct or the second partial duct in a fluid-tight manner, and wherein the outlet duct branches into two partial ducts, a first partial duct extending through the spindle unit into the valve seat-side space and opening out thereof, and a second partial duct opening out into the cover-side space, and a second closure body being provided which seals either the first partial duct or the second partial duct of the outlet duct in a fluid-tight manner, wherein the first closure body seals the first partial duct of the pressure fluid duct when the second closure body seals the second partial duct of the outlet duct, and vice versa.

* * * * *